(12) United States Patent
Bauer

(10) Patent No.: US 8,309,675 B2
(45) Date of Patent: Nov. 13, 2012

(54) HIGHLY ACETALIZED, COARSE-GRAINED POLYVINYL ACETOACETALS

(75) Inventor: Werner Bauer, Burgkirchen (DE)

(73) Assignee: Kuraray Europe GmbH, Frankfurt am Main (DE)

( * ) Notice: Subject to any disclaimer, the term of this patent is extended or adjusted under 35 U.S.C. 154(b) by 807 days.

(21) Appl. No.: 12/302,104

(22) PCT Filed: May 25, 2007

(86) PCT No.: PCT/EP2007/055079
§ 371 (c)(1),
(2), (4) Date: Feb. 20, 2009

(87) PCT Pub. No.: WO2007/137999
PCT Pub. Date: Dec. 6, 2007

(65) Prior Publication Data
US 2009/0312516 A1    Dec. 17, 2009

(30) Foreign Application Priority Data
Jun. 1, 2006    (DE) .......................... 10 2006 025 707

(51) Int. Cl.
*C08G 16/02* (2006.01)
*C08G 16/04* (2006.01)
*C08G 16/00* (2006.01)

(52) U.S. Cl. .......................... 528/246; 528/499; 528/503
(58) Field of Classification Search .................. 528/246, 528/499, 503
See application file for complete search history.

(56) References Cited

U.S. PATENT DOCUMENTS
2004/0024137 A1    2/2004    Kusudou et al.

FOREIGN PATENT DOCUMENTS
EP    1 384 731 A1    1/2004
JP    06-228227 A    8/1994

*Primary Examiner* — Duc Truong
(74) *Attorney, Agent, or Firm* — Millen, White, Zelano, Branigan, P.C.

(57) ABSTRACT

The invention relates to highly acetalized, coarse-grained polyvinyl acetals with a degree of acetalization of >80 mol % and an average grain size of $\geq 100$ μm obtainable by acetalization of partially or fully hydrolyzed polyvinyl esters with a degree of hydrolysis of $\geq 70$ mol % with acetaldehyde, characterized by the fact that the acetalization is started at a temperature $T_1$ of $0°\,C. \leq T_1 \leq +20°\,C.$ and is then continued at a temperature $T_2$ of $>+40°\,C.$, wherein the temperature $T_2$ is held for a time period of 0.05 to 4 hours and the acetalization is performed in a closed reactor.

18 Claims, No Drawings

HIGHLY ACETALIZED, COARSE-GRAINED POLYVINYL ACETOACETALS

The invention relates to highly acetalized, coarse-grained polyvinyl acetoacetals, methods of production and use thereof.

The production of polyvinyl acetals, obtained from the respective polyvinyl alcohols by polymer-analogous reaction with the respective aldehydes, has been known since 1924, a multitude of aldehydes having been used for the production of the respective polyvinyl acetals since then. Polyvinyl acetals are generally prepared in a 3-step process (polyvinyl acetate→polyvinyl alcohol→polyvinyl acetal), products resulting from the process which, besides vinyl acetal groups, also contain vinyl alcohol and vinyl acetate units. Especially polyvinyl formal, polyvinyl acetoacetal, and polyvinyl butyral (PVB) have gained commercial importance. Polyvinyl acetals are utilized for laminated safety glass and glass laminates, high safety glass, or window films. Because of their good pigment binding strength, among other things, polyvinyl butyrals in particular are also used as binding agents in lacquers and varnishes and particularly in printing inks.

In the last step of the production of polyvinyl acetals, the respective partially or fully saponified polyvinyl ester (polyvinyl alcohol) is acetalized with the respective aldehyde in the presence of acid. Typically, the acetalization reaction is started at a low temperature $T_1$ and subsequently continued and completed at a higher temperature $T_2$.

In EP 0 271 861 A2 and EP 0 513 857 A1, it is suggested to perform the acetalization using an acetaldehyde to form a polyvinyl acetoacetal in two different temperature ranges, and maintain these temperatures over a defined period of time. Specifically, it is recommended to start the acetalization at a $T_1$ of +80° C. to +17° C. and preferably maintain this temperature for 1 to 6 hours, and to subsequently continue the acetalization at a $T_2$ of +25° C. to +40° C. and maintain this temperature for 2 to 8 hours. By maintaining at a lower temperature $T_1$, a high degree of acetalization is guaranteed, and by maintaining at a relatively moderate higher temperature level $T_2$, a uniform degree of acetalization of the reaction products is supposed to be ensured. At temperatures $T_2$ of more than +40° C., the degree of acetalization is reduced again with this method. Comparative Example B-5 for example shows that at a temperature level $T_2$ of +50° C., a degree of acetalization of just 71.5 mol % could be achieved. In addition, the products produced at temperatures $T_2$ of >+40° C. show insufficient solubility in non-alcoholic solvents such as for example methyl ethyl ketone (MEK).

In EP 0 271 861 A2, it is also described that the grain size of the polyvinyl acetoacetal is significantly determined via temperature $T_1$ at the start of the acetalization. Temperatures $T_1$ of +19° C. and more result in a very coarse and non-uniform grain. Furthermore, the examples in EP 0 271 861 A2 do not show any identifiable dependence of the grain size from the temperature $T_2$ for the continuation of the reaction. It is therefore a disadvantage of this method that the product is obtained with degrees of acetalization of >70 mol % with a relatively fine grain of 25 to 75 µm average grain size, and only with lower degrees of acetalization of <70 mol %, medium grain sizes of greater than 100 µm can be achieved.

In EP 1 384 731 A1, it is recommended to start the acetalization in a temperature range $T_1$ of −10° C. to +30° C. and then adjust the temperature $T_2$ to 50° C. to 80° C. However, a degree of acetalization of >80 mol % is not achieved with this method. In EP 1 284 274 A1, EP 1 369 439 A1, and WO 2004/026917 A1, methods are described wherein the acetalization is started at temperatures $T_1$ in the range of −10° C. to +30° C. and continued at temperatures $T_2$ in the range of +20° C. to +60° C. However, degrees of acetalization of >80 mol % are also not obtained here. The disadvantage of this method when using acetaldehyde is, as described in EP 0 271 861 A2, that by continuing the reactions at temperatures $T_2$ in the range of +20° C. to +40° C., with degrees of acetalization of >70 mol %, only relatively fine particles are obtained, and at temperatures of >+40° C., only relatively low degrees of acetalization of <80 mol % can be achieved.

In EP 1 270 608 A1, a method is described wherein the acetalization is started at temperatures $T_1$ of +12° C. or +20° C. and continued at temperatures $T_2$ of +60° C. or +30° C. However, only products with degrees of acetalization of <80 mol % are obtained. Here as well, the disadvantage when using acetaldehyde is, as described in EP 0 271 861 A2, that at a temperature $T_2$ of +30° C., with degrees of acetalization of >70 mol %, very fine product particles are formed, and at temperatures $T_2$ of +60° C., a degree of acetalization of >80 mol % cannot be achieved.

In EP 1 384 732 A1, it is recommended to start the acetalization at a temperature $T_1$ of 0° C. and then continue it at a temperature $T_2$ of +25° C., and in EP 0 150 293, it is recommended to start the acetalization at a temperature $T_1$ of +14.4° C. and continue it at a temperature $T_2$ of +40° C. The disadvantage of these methods is that with degrees of acetalization of >70 mol %, in case of EP 1 384 732 A1, product precipitation does not takes place, and in case of EP 0 150 293, relatively finely divided products in the range of 25 to 75 µm average particle size are obtained.

In EP 1 557 261 A1, methods are described wherein the acetalization is started at temperatures $T_1$ of −10° C. to +30° C. and continued at temperatures $T_2$ of +50° C. to +80° C. Polyvinyl acetals with different aldehydes and with degrees of acetalization of 40 to 90 mol % are described, however, as already known from EP 0 271 861 A2 and EP 0 513 857 A1, high degrees of acetalization of >80 mol % could not be achieved with acetaldehyde at temperatures of >+40° C.

The object was therefore to provide polyvinyl acetoacetals with a high degree of acetalization of >80 mol % and an average grain size of ≧100 µm.

Subject matter of the invention are highly acetalized, coarse-grained polyvinyl acetoacetals with a degree of acetalization of >80 mol % and an average grain size of ≧100 µm obtainable by acetalization of partially or fully saponified polyvinyl esters with a degree of hydrolysis of ≧70 mol % with acetaldehyde, characterized in that the acetalization is started at a temperature $T_1$ of 0° C.≦$T_1$≦+20° C. and subsequently continued at a temperature $T_2$ of >+40° C., the temperature $T_2$ being maintained over a period of time of 0.05 to 4 hours and the acetalization being performed in a closed reactor.

A further subject matter of the invention is a method for the production of highly acetalized, coarse-grained polyvinyl acetoacetals with a degree of acetalization of >80 mol % and an average grain size of ≧100 µm by acetalization of partially or fully saponified polyvinyl esters with a degree of hydrolysis of ≧70 mol % with acetaldehyde, characterized in that the acetalization is started at a temperature $T_1$ of 0° C.≦$T_1$≦+20° C. and subsequently continued at a temperature $T_2$ of >+40° C., the temperature $T_2$ being maintained over a period of time of 0.05 to 4 hours and the acetalization being performed in a closed reactor.

Suitable partially saponified and fully saponified polyvinyl esters are derived from vinyl ester polymers containing 70 to 100 mol % of vinyl ester units. Suitable vinyl esters are vinyl esters of unbranched or branched carboxylic acids having 1 to 15 C atoms. Preferred vinyl esters are vinyl acetate, vinyl propionate, vinyl butyrate, vinyl-2-ethyl hexanoate, vinyl laurate, 1-methylvinyl acetate (isopropenyl acetate), vinyl pivalate, and vinyl esters of α-branched monocarboxylic acids having 5 to 11 C atoms, for example VeoVa9® or VeoVa10® (trade names of the company Resolution). Vinyl acetate is especially preferred.

Besides the vinyl ester units, one or more monomers from the group comprising methacrylic acid esters and acrylic acid esters of alcohols having 1 to 15 C atoms, olefins, dienes, vinyl aromatic compounds, and vinyl halides may optionally also be co-polymerized. Suitable monomers from the group of esters of acrylic acid or methacrylic acid are esters of unbranched or branched alcohols having 1 to 15 C atoms. Preferred methacrylic acid esters or acrylic acid esters are methyl acrylate; methyl methacrylate; ethyl acrylate; ethyl methacrylate; propyl acrylate; propyl methacrylate; n-, iso-, and t-butyl acrylate; n-, iso-, and t-butyl methacrylate; 2-ethylhexyl acrylate; norbornyl acrylate. Especially preferred are methyl acrylate; methyl methacrylate; n-, iso-, and t-butyl acrylate; 2-ethylhexyl acrylate; and norbornyl acrylate. Suitable diens are 1,3-butadiene and isoprene. Examples for polymerizable olefins are ethene and propene. As vinyl aromatic compounds, styrene and vinyl toluene may be polymerized in. Vinyl chloride, vinylidene chloride, or vinyl fluoride, preferably vinyl chloride, are typically employed from the group of vinyl halides. The portion of these comonomers is determined in such a way that the portion of vinyl ester monomer in the vinyl ester polymer is ≧70 mol %.

Optionally, additional comonomers in an amount of preferably 0.02 to 20% by weight, based on the total weight of the vinyl ester polymer, may also be included. Examples for such comonomers are ethylenically unsaturated mono- and dicarboxylic acids, preferably crotonic acid, itaconic acid, fumaric acid, and maleic acid; further ethylenically unsaturated carboxylic acid amides and nitriles, preferably N-vinyl formamide; also cyclic amides carrying an unsaturated group on the nitrogen atom, such as N-vinyl pyrrolidone; mono- and diesters of fumaric acid and maleic acid, such as the diethyl and diisopropyl esters, and maleic anhydride, ethylenically unsaturated sulfonic acids or salts thereof, preferably vinylsulfonic acid. Suitable as comonomers are also cationic monomers, such as diallyldimethylammonium chloride (DADMAC), 3-trimethylammoniumpropyl (meth)acrylamide chloride (MAPTAC), and 2-trimethylammoniumethyl (meth)acrylate chloride. Furthermore, vinyl ethers and vinyl ketones are suitable as auxiliary monomers.

Suitable comonomers are also polymerizable silanes and mercaptosilanes. Preferred are γ-acryl- and γ-methacryloxypropyltri(alkoxy)silanes, α-methacryloxymethyltri(alkoxy)silanes, γ-methacryloxypropylmethyldi(alkoxy)silanes, vinylalkyldi(alkoxy)silanes, and vinyltri(alkoxy)silanes, methoxy, ethoxy, methoxyethylene, ethoxyethylene, methoxypropylene glycol ether, and ethoxypropylene glycol ether radicals for example being usable as alkoxy group. Examples are vinyltrimethoxysilane, vinyltriethoxysilane, vinyltri-propoxysilane, vinyltriisopropoxysilane, vinyltris-(1-methoxy)-isopropoxysilane, vinyltributoxysilane, vinyltriacetoxysilane, 3-methacryloxypropyltrimethoxysilane, 3-methacryloxypropylmethyldimethoxysilane, methacryloxymethyltrimethoxysilane, 3-meth-acryloxypropyl-tris(2-methoxyethoxy)silane, vinyltrichorosilane, vinylmethyldichlorosilane, vinyltris-(2-methoxyethoxy)silane, trisacetoxyvinylsilane, 3-(triethoxysilyl)propyl(succinic anhydride)silane. 3-Mercaptopropyltriethoxysilane, 3-mercaptopropyltrimethoxysilane, and 3-mercaptopropylmethyldimethoxysilane are also preferred.

Further examples are pre-crosslinking comonomers such as ethylenically polyunsaturated comonomers, for example divinyl adipate, diallyl maleate, allyl methacrylate, butanediol diacrylate, or triallyl cyanurate; or post-crosslinking comonomers, for example acrylamidoglycolic acid (AGA), methylacrylamidoglycolic acid methyl ester (MAGME), N-methylolacrylamide (NMA), Nmethylolmethacrylamide, N-methylolallyl carbamate, alkyl ethers, such as isobutoxy ether or esters of N-methylolacrylamide, N-methylolmethacrylamide, and N-methylolallyl carbamate.

These vinyl ester polymers are commercially available or may be prepared in known manner by means of polymerization; preferably by bulk polymerization, suspension polymerization, or by polymerization in organic solvents, particularly preferably in an alcoholic solution. Suitable solvents and modifiers are for example methanol, ethanol, propanol, isopropanol. The polymerization is performed at reflux at a temperature of 40° C. to 100° C. and is initiated radically by adding common initiators. Examples for common initiators are percarbonates, such as cyclohexyl peroxy dicarbonate, azo initiators, or peresters, such as t-butyl perneodecanoate or t-butyl perpivalate. The adjustment of the molecular weight may occur in known manner by addition of modifier, by means of the solvent content, by variation of the initiator concentration, and by variation of the temperature. After completion of the polymerization, the solvent and excess monomer and modifier, if necessary, can be removed by distillation.

Transesterification or saponification of the vinyl ester polymers occurs in a manner known per se, for example according to the belt or kneader process, in an alkaline or acidic medium with addition of acid or base. Preferably, the vinyl ester solid resin is contained in alcohol, for example methanol, the solids content being adjusted to 15 to 70% by weight. The transesterification or hydrolysis is preferably performed in a basic medium, for example by addition of NaOH, KOH, or $NaOCH_3$. The base is generally used in a quantity of 1 to 5 mol % per mol of ester units. The transesterification or hydrolysis is performed at temperatures of 20° C. to 70° C. After completion of the transesterification or hydrolysis, the reaction mixture is neutralized, if necessary; the solvent is removed by distillation; and the polyvinyl alcohol is obtained as a powder or granular material. However, the polyvinyl alcohol may also be obtained as an aqueous solution by successive addition of water while the solvent is removed by distillation.

Such polymers are referred to as fully saponified polyvinyl esters, the degree of hydrolysis of which is >96 mol %. By partially saponified polyvinyl esters are meant those having a degree of hydrolysis of ≧70 mol % and ≦96 mol %. The partially or fully saponified vinyl ester polymers preferably have a degree of hydrolysis of 70 mol % to 99.9 mol %, particularly preferably 90 mol % to 99.9 mol %. The viscosity of the polyvinyl alcohol (DIN 53015, method according to Höppler; 4% solution in water) is 1 to 40 mPas, preferably 1 to 30 mPas, and serves as a measure for the molecular weight and the degree of polymerization of the partially or fully saponified polyvinyl esters. The degree of polymerization of the polyvinyl alcohol used is preferably at least 100.

For the acetalization, acetaldehyde is used, which can also be used in the form of its semiacetals or full acetals or its aldehyde hydrates. The added amount of acetaldehyde depends on the desired degree of acetalization. Typically, an excess of acetaldehyde with respect to the theoretical amount is used in the method according to the invention. Preferably, the degree of acetalization is >83 mol %.

For the acetalization, the partially or fully saponified polyvinyl esters are preferably contained in an aqueous medium. Typically, a solids content of the aqueous solution of 4 to 30% by weight is established. The acetalization occurs in the presence of acidic catalysts such as hydrochloric acid, sulfuric acid, nitric acid, or phosphoric acid. The content of acidic catalyst depends on the desired speed of the reaction, the catalytic action of the catalyst, the desired degree of acetalization, and the product purity aimed for. When using hydrochloric acid, a content of acidic catalyst of greater than 2% by weight of hydrochloric acid based on the entire reaction formulation, but less than 12% by weight of hydrochloric acid based on the entire reaction formulation has proven to be advantageous. A content of 3 to 8% by weight of hydrochloric acid, based on the entire reaction formulation, was particularly advantageous for the method according to the invention.

The acetalization may be performed in different ways: polyvinyl alcohol, acidic catalyst, and water may be provided, and the acetaldehyde may be added with different dosing rates to start the reaction. In addition, it is also possible to only provide part of the vinyl alcohol and/or the water and/or the acidic catalyst and to add the aldehyde and the remaining quantities of polyvinyl alcohol and/or water and/or acidic catalyst in different dosing rates and also at different times. In order to initiate the acetalization, the acidic catalyst may also be added to part of the reactants polyvinyl alcohol, water, and acetaldehyde or to the entire quantity of the reactants polyvinyl alcohol, water, and acetaldehyde in different dosing rates.

To start the reaction, the reaction mixture is cooled to a temperature $T_1$ of $0°$ C.$\leqq T_1 \leqq +20°$ C., preferably $+2°$ C.$\leqq T_1 \leqq +16°$ C. The acetalization reaction is started by adding acetaldehyde or the semiacetal or full acetal thereof. Preferably, the formulation is maintained in this temperature range for 0.5 to 4 hours.

Subsequently, the formulation is heated to a temperature $T_2$ of $>+40°$ C., preferably $\geqq +45°$ C., particularly preferably $+40°$ C.$<T_2<+55°$ C. or $+45°$ C.$\leqq T_2 \leqq +50°$ C., and maintained at this temperature for 0.05 to 4 hours. In our investigations, we were able to determine that in case of acetalization with acetaldehyde, the grain size may indeed be influenced via temperature $T_2$. At temperatures $T_2$ of greater than $+40°$ C., products with a degree of acetalization of $>80$ mol % r preferably $>83$ mol %, and with an average grain size of $\geqq 100$ µm are successfully obtained, independent of the set value of $T_1$. It is essential that the acetalization is performed in a closed system without gas exchange with the environment.

The solid reaction product is isolated by filtration and a downstream washing step. Furthermore, in order to stabilize and neutralize acid residues present, alkalies may be added. During precipitation and aftertreatment, emulsifiers may be used to stabilize the aqueous suspension of the polyvinyl acetoacetal. The average grain size of the polyvinyl acetoacetal obtained in this manner is $\geqq 100$ µm, preferably 100 to 300 µm.

Due to the coarser grain shape, the polyvinyl acetoacetal according to the invention exhibits a higher bulk density, significantly lower dust content, and an improved flowability. All this is advantageous for lower transport costs, a better use of storage capacity, and simplified handling when preparing solutions of the polyvinyl acetoacetal. The coarser product particles are also less susceptible to agglomeration in solvents and the dissolution speed of the polyvinyl acetal is therefore significantly improved.

The highly acetalized, coarse-grained polyvinyl acetoacetals are particularly suitable for use as binding agents in printing inks. Suitable printing ink formulations are known to those skilled in the art and generally contain 5 to 50% by weight of pigment content, for example diazo or phthalocyanine pigments, 4 to 25% by weight of polyvinyl acetal binding agent, and solvent, for example alcohols, such as ethanol, or esters, such as ethyl acetate. Optionally, additional additives such as retarders, adhesion promoters, plasticizers, and other additives such as for example fillers and waxes may also be included.

The highly acetalized, coarse-grained polyvinyl acetoacetals are also very well suited for laminated safety glass and glass laminates, high safety glass, or window films.

The highly acetalized, coarse-grained polyvinyl acetoacetals may further be advantageously used as binding agents in aqueous-based or organic solvent-based lacquers and varnishes, for example as binding agent for the interior coating of cans. Other fields of application for highly acetalized, coarse-grained polyvinyl acetoacetals are the use as binding agent in anti-corrosion agents. Furthermore, the highly acetalized, coarse-grained polyvinyl acetoacetals are also suitable as binding agent in the ceramics industry, specifically as binding agents for ceramic green bodies. The use as binding agent for ceramic powders and metal powders in injection molding (powder injection molding) should also be mentioned.

Furthermore, the highly acetalized, coarse-grained polyvinyl acetoacetals may be used as binding agents for photographic films. In particular, they may be profitably used as binding agents for photothermographic materials such as heat transfer sheets. Such films generally consist of a substrate film and a heat transfer layer, in which the polyvinyl acetoacetal is used as binding agent.

The following examples are provided to further explain the invention without limiting it in any way: All examples were normalized to 100 kg of total reaction mass.

EXAMPLE 1

In a closed reactor, an aqueous solution of 5.2 kg of a fully saponified polyvinyl alcohol, viscosity 2.9 mPas (DIN 53015; method according to Höppler; 4% aqueous solution; degree of polymerization 320; Mw approx. 14000; degree of hydrolysis 97.8 mol %) in 73.7 kg of water with 18 kg of 20% hydrochloric acid solution were provided. The provided solution was cooled to $+10°$ C. (temperature $T_1$) while stirring. Subsequently, 3.2 kg of acetaldehyde was added over a period of 30 minutes. After 40 minutes of additional reaction time at $+10°$ C., the temperature was raised to $50°$ C. over a period of 180 minutes and this temperature $T_2$ maintained for additional 180 minutes. After that, the product was filtered and washed with distilled water until the filtrate reacted neutral. Afterwards, drying to a solids content of at least 98% by weight took place.

A white, powdery polyvinyl acetoacetal with 11.9% by weight of vinyl alcohol units was obtained. The degree of acetalization was 83.7 mol % and the average grain size was 120 µm. The product was clearly soluble in 95% ethanol and methyl ethyl ketone (MEK).

EXAMPLE 2

In a closed reactor, an aqueous solution of 6.5 kg of a fully saponified polyvinyl alcohol, viscosity 3.4 mPas (DIN 53015; method according to Höppler; 4% aqueous solution; degree of polymerization 400; Mw approx. 18000; degree of hydrolysis 97.9 mol %) in 55.2 kg of water with 34.5 kg of 20% hydrochloric acid solution were provided. The provided solution was cooled to $+16°$ C. (temperature $T_1$) while stirring. Subsequently, 3.8 kg of acetaldehyde was added over a period of 30 minutes. After 60 minutes of additional reaction time at $+16°$ C., the temperature was raised to $50°$ C. over a period of 300 minutes and this temperature $T_2$ maintained for additional 5 minutes. After this, the product was filtered, washed with distilled water, and re-suspended in water. Remainders of the acidic catalyst present were neutralized with NaOH. Finally, the product was again filtered off; again washed with distilled water; and, subsequently, drying to a solids content of at least 98.5% by weight took place. A white, powdery polyvinyl acetoacetal with 11.0% by weight of vinyl alcohol units was obtained. The degree of acetalization was 84.8 mol % and the average grain size was 110 μm. The product was clearly soluble in 95% ethanol and methyl ethyl ketone (MEK).

EXAMPLE 3

In a closed reactor, an aqueous solution of 5.5 kg of a fully saponified polyvinyl alcohol, viscosity 5.4 mPas (DIN 53015; method according to Höppler; 4% aqueous solution; degree of polymerization 850; Mw approx. 38000; degree of hydrolysis 98.1 mol %) in 56.2 kg of water with 34.5 kg of 20% hydrochloric acid solution were provided. The provided solution was cooled to +14° C. (temperature $T_1$) while stirring. Subsequently, 3.8 kg of acetaldehyde was added over a period of 30 minutes. After 60 minutes of additional reaction time at +14° C., the temperature was raised to 50° C. over a period of 300 minutes and this temperature $T_2$ maintained for additional 5 minutes. After this, the product was filtered, washed with distilled water, and re-suspended in water. Remainders of the acidic catalyst present were neutralized with NaOH. Finally, the product was again filtered off; again washed with distilled water; and, subsequently, drying to a solids content of at least 98.5% by weight took place.

A white, powdery polyvinyl acetoacetal with 10.2% by weight of vinyl alcohol units was obtained. The degree of acetalization was 85.8 mol % and the average grain size was 110 μm. The product was clearly soluble in 95% ethanol and methyl ethyl ketone (MEK).

EXAMPLE 4

In a closed reactor, an aqueous solution of 5.4 kg of a fully saponified polyvinyl alcohol, viscosity 5.4 mPas (DIN 53015; method according to Höppler; 4% aqueous solution; degree of polymerization 850; Mw approx. 38000; degree of hydrolysis 98.1 mol %) in 58.4 kg of water with 32.5 kg of 20% hydrochloric acid solution were provided. The provided solution was cooled to +7° C. (temperature $T_1$) while stirring. Subsequently, 3.7 kg of acetaldehyde was added over a period of 30 minutes. After 40 minutes of additional reaction time, the temperature was raised to 50° C. over a period of 280 minutes and this temperature $T_2$ maintained for additional 10 minutes. After this, the product was filtered, washed with distilled water, and re-suspended in water. Remainders of the acidic catalyst present were neutralized with NaOH. Finally, the product was again filtered off; again washed with distilled water; and, subsequently, drying to a solids content of at least 98.5% by weight took place.

A white, powdery polyvinyl acetoacetal with 11.6% by weight of vinyl alcohol units was obtained. The degree of acetalization was 84.1 mol % and the average grain size was 155 μm. The product was clearly soluble in 95% ethanol and methyl ethyl ketone (MEK).

COMPARATIVE EXAMPLE 1

In a closed reactor, an aqueous solution of 5.8 kg of a fully saponified polyvinyl alcohol, viscosity 3.4 mPas (DIN 53015; method according to Höppler; 4% aqueous solution; degree of polymerization 400; Mw approx. 18000; degree of hydrolysis 97.9 mol %) in 60.4 kg of water with 30 kg of 20% hydrochloric acid solution were provided. The provided solution was cooled to +10° C. (temperature $T_1$) while stirring. Subsequently, 3.8 kg of acetaldehyde was added over a period of 30 minutes. After 40 minutes of additional reaction time, the temperature was raised to 30° C. over a period of 180 minutes and this temperature $T_2$ maintained for additional 150 minutes. After this, the product was filtered and washed with distilled water until the filtrate reacted neutral. Afterwards, drying to a solids content of at least 98% by weight took place. A white, powdery polyvinyl acetoacetal with 11.5% by weight of vinyl alcohol units was obtained. The degree of acetalization was 84.2 mol % and the average grain size was 40 μm. The product was clearly soluble in 95% ethanol and methyl ethyl ketone (MEK).

COMPARATIVE EXAMPLE 2

Example B-8 in EP 0 271 861 A2

In a reactor, an aqueous solution of 6.2 kg of a fully saponified polyvinyl alcohol (degree of polymerization 500, degree of hydrolysis 98.8 mol %) in 78.1 kg of water with 11.7 kg of 35% hydrochloric acid solution was provided. The provided solution was cooled to +11° C. (temperature $T_1$). Subsequently, 4.0 kg of acetaldehyde was added. After 30 minutes, precipitation took place and the reaction was continued at a temperature $T_2$ of +30° C. for 180 minutes. After this, the product was washed with water and neutralized.

A polyvinyl acetoacetal with a degree of acetalization of 75.0 mol % was obtained and the average grain size was 40 μm.

COMPARATIVE EXAMPLE 3

Comparative Example B-5 in EP 0 271 861 A2

In a reactor, an aqueous solution of 5.8 kg of a fully saponified polyvinyl alcohol (degree of polymerization 2400, degree of hydrolysis 98.8 mol %) in 78.1 kg of water with 17.2 kg of 35% hydrochloric acid solution was provided. The provided solution was cooled to +11° C. (temperature $T_1$). Subsequently, 3.8 kg of acetaldehyde was added. After 120 minutes, precipitation took place and the reaction was continued at a temperature $T_2$ of +50° C. for 180 minutes. After this, the product was washed with water and neutralized.

A polyvinyl acetoacetal with a degree of acetalization of 71.5 mol % was obtained and the average grain size was 60 μm. The product was insoluble in methyl ethyl ketone (MEK).

In the following Table 1, the most important formulation data and the most important analytic results of the Examples and Comparative Examples are summarized for better clearness.

Examples 1 to 4 prove that in the production of polyvinyl acetoacetal, independent of temperature $T_1$, at which the acetalization is started, by continuing the reaction at a temperature $T_2$ of >+40° C. in a closed reactor, an average grain size of $\geq$100 μm and a degree of acetalization of >80 mol % can be achieved. The products are all clearly soluble in methyl ethyl ketone.

Comparative Example 1 shows that with a comparable recipe and a similar reaction procedure as in Examples 1, 2, and 4, but at a temperature $T_2$ of +30° C., in a closed reactor, a high degree of acetalization of 84.2 mol % but only a relatively fine grain of 40 μm average grain size can be obtained.

Comparative Example 2 (=Example B-8 in EP 0 271 861 A2) shows that in a reactor that is not closed, with a comparable recipe and a similar reaction procedure as in Examples 1, 2, 4, and Comparative Example 1, a degree of acetalization of >80 mol % cannot be achieved, and the temperature $T_2$ of +30° C. entails a relatively fine grain shape of 40 μm.

Comparative Example 3 (=Comparative Example B-5 in EP 0 271 861 A2) shows that in a reactor that is not closed, at a temperature $T_2$ of +50° C., neither a high degree of acetalization of >80 mol % nor an average grain size of $\geq$100 μm is achievable.

TABLE 1

Summary of the Examples and Comparative Examples

| | PVOH DP | PVOH DH | PVOH wt % | HCl wt % | AA wt % | $T_1$ °C. | $T_2$ °C. | $t_2$ min | DA mol % | GS μm | MEK |
|---|---|---|---|---|---|---|---|---|---|---|---|
| Ex. 1 | 320 | 97.8 | 5.2 | 3.6 | 3.2 | 10 | 50 | 180 | 83.7 | 120 | S |
| Ex. 2 | 400 | 97.9 | 6.5 | 6.9 | 3.8 | 16 | 50 | 5 | 84.8 | 110 | S |
| Ex. 3 | 850 | 98.1 | 5.5 | 6.9 | 3.8 | 14 | 50 | 5 | 85.8 | 110 | S |
| Ex. 4 | 850 | 98.1 | 5.4 | 6.5 | 3.7 | 7 | 50 | 10 | 84.1 | 155 | S |
| Comp. Ex. 1 | 400 | 97.9 | 5.8 | 6.0 | 3.8 | 10 | 30 | 150 | 84.2 | 40 | S |
| Comp. Ex. 2 | 500 | 98.8 | 6.2 | 4.1 | 4.0 | 11 | 30 | 180 | 70.8 | 40 | n.s. |
| Comp. Ex. 3 | 2400 | 98.8 | 5.8 | 6.0 | 3.8 | 11 | 50 | 180 | 71.5 | 60 | IS |

PVOH = polyvinyl alcohol
DP = degree of polymerization
DH = degree of hydrolysis in mol %
AA = acetaldehyde
$t_2$ = time at $T_2$
DA = degree of acetalization
GS = average grain size
MEK = solubility in MEK (S = soluble, IS = insoluble)

The invention claimed is:

1. A method for the production of highly acetalized, coarse-grained polyvinyl acetals with a degree of acetalization of >80 mol % and an average grain size of ≧100 μm, said method comprising:
subjecting partially or fully saponified polyvinyl esters with a degree of hydrolysis of ≧70 mol % to acetalization with acetaldehyde,
wherein acetalization is started at a temperature $T_1$ of 0° C.≦$T_1$≦+20° C. and subsequently continued at a temperature $T_2$ of >+40° C., the temperature $T_2$ being maintained over a period of time of 0.05 to 4 hours, and the acetalization being performed in a closed reactor.

2. A method for the production of highly acetalized, coarse-grained polyvinyl acetals according to claim 1, wherein the temperature $T_2$ is 40° C.<$T_2$≦+55° C.

3. A method for the production of highly acetalized, coarse-grained polyvinyl acetals according to claim 1, wherein acetalization is performed without gas exchange with the environment.

4. A method for the production of highly acetalized, coarse-grained polyvinyl acetals according to claim 2, wherein acetalization is performed without gas exchange with the environment.

5. A highly acetalized, coarse-grained polyvinyl acetal with a degree of acetalization of >80 mol % and an average grain size of ≧100 μm, prepared by a method comprising acetalization of partially or fully saponified polyvinyl esters with a degree of hydrolysis of ≧70 mol % with acetaldehyde, wherein acetalization is started at temperature T1 of 0 C≦T1≦+20 C and subsequently continued at a temperature T2 of >+40 C, the temperature T2 being maintained over a period of time of 0.05 to 4 hours and the acetalization being performed in a closed reactor.

6. A printing ink comprising a highly acetalized, coarse-grained polyvinyl acetal according to claim 5 as a binding agent.

7. A lacquer or varnish comprising a highly acetalized, coarse-grained polyvinyl acetal according to claim 5 as a binding agent.

8. A ceramic green body, ceramic powder, or metal powder comprising a highly acetalized, coarse-grained polyvinyl acetal according to claim 5 as a binding agent.

9. A photographic film comprising a highly acetalized, coarse-grained polyvinyl acetal according to claim 5 as a binding agent.

10. A photothermographic material comprising a highly acetalized, coarse-grained polyvinyl acetal according to claim 5 as a binding agent.

11. A method for the production of highly acetalized, coarse-grained polyvinyl acetals according to claim 3, wherein said partially or fully saponified vinyl ester polymers have a degree of hydrolysis of 70 mol % to 99.9 mol %.

12. A method for the production of highly acetalized, coarse-grained polyvinyl acetals according to claim 3, wherein said partially or fully saponified vinyl ester polymers have a degree of hydrolysis of 90 mol % to 99.9 mol %.

13. A method for the production of highly acetalized, coarse-grained polyvinyl acetals according to claim 3, wherein acetalization is started at a temperature $T_1$ of +2° C.≦$T_1$≦+16° C.

14. A method for the production of highly acetalized, coarse-grained polyvinyl acetals according to claim 3, wherein the temperature $T_2$ is +45° C.≦$T_2$≦+50° C.

15. A method for the production of highly acetalized, coarse-grained polyvinyl acetals according to claim 3, wherein the obtained highly acetalized, coarse-grained polyvinyl acetals with a degree of acetalization of >83 mol %.

16. A method for the production of highly acetalized, coarse-grained polyvinyl acetals according to claim 3, wherein the average grain size of the obtained highly acetalized, coarse-grained polyvinyl acetals is 100 to 300 nm.

17. A method according to claim 3, wherein the temperature $T_1$ of 0° C.≦$T_1$≦+20° C. is maintained for 0.5 to 4 hours.

18. A method for the production of highly acetalized, coarse-grained polyvinyl acetals according to claim 11, wherein:
temperature $T_1$ is +2° C.≦$T_1$≦+16° C.;
temperature $T_2$ is +45° C.≦$T_2$≦+50° C.;
the obtained highly acetalized, coarse-grained polyvinyl acetals with a degree of acetalization of >83 mol %; and
the average grain size of the obtained highly acetalized, coarse-grained polyvinyl acetals is 100 to 300 μm.

* * * * *

UNITED STATES PATENT AND TRADEMARK OFFICE
CERTIFICATE OF CORRECTION

| | | |
|---|---|---|
| PATENT NO. | : 8,309,675 B2 | Page 1 of 1 |
| APPLICATION NO. | : 12/302104 | |
| DATED | : November 13, 2012 | |
| INVENTOR(S) | : Werner Bauer | |

It is certified that error appears in the above-identified patent and that said Letters Patent is hereby corrected as shown below:

In the Claims:

Column 10, line 50 (Claim 16), reads: "ized, coarse-grained polyvinyl acetals is 100 to 300 nm."
It should read: -- ized, coarse-grained polyvinyl acetals is 100 to 300 μm. --

Signed and Sealed this
Fifth Day of February, 2013

Teresa Stanek Rea
*Acting Director of the United States Patent and Trademark Office*